(12) United States Patent
Deutscher

(10) Patent No.: US 11,333,477 B2
(45) Date of Patent: *May 17, 2022

(54) TAPE MEASURE DEVICE AND ATTACHMENT FOR MEASURING AND CUTTING DRYWALL

(71) Applicant: Drywall Devil, LLC, Safety Harbor, FL (US)

(72) Inventor: Edward Deutscher, Safety Harbor, FL (US)

(73) Assignee: DRYWALL DEVIL, LLC, Safety Harbor, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/777,884

(22) Filed: Jan. 30, 2020

(65) Prior Publication Data

US 2020/0166323 A1 May 28, 2020

Related U.S. Application Data

(63) Continuation-in-part of application No. 15/569,690, filed as application No. PCT/US2016/029464 on Apr.
(Continued)

(51) Int. Cl.
*G01B 3/1089* (2020.01)
*G01B 3/1071* (2020.01)
(Continued)

(52) U.S. Cl.
CPC ......... *G01B 3/1071* (2013.01); *G01B 3/1046* (2020.01); *G01B 3/1056* (2013.01); *G01B 3/1089* (2020.01); *G01B 2003/1074* (2013.01)

(58) Field of Classification Search
CPC .. G01B 3/1089; G01B 3/1071; G01B 3/1046; G01B 3/1056; G01B 3/1048; G01B 2003/1048
(Continued)

(56) References Cited

U.S. PATENT DOCUMENTS

| 776,897 | A | * | 12/1904 | Ferris | ........................ | B43L 9/04 |
| | | | | | | 33/27.03 |
| 2,349,670 | A | * | 5/1944 | Moxey | .................... | B43L 9/045 |
| | | | | | | 33/27.03 |

(Continued)

FOREIGN PATENT DOCUMENTS

DE   102012112688 A1   7/2014

*Primary Examiner* — Christopher W Fulton
(74) *Attorney, Agent, or Firm* — Mark C. Johnson; Johnson Dalal (57) ABSTRACT

A tape measure device and attachment for measuring and cutting drywall that includes a tape measure with an anchoring member disposed at the rear end of the housing and having a rear surface defining a rear aperture and a rear plane thereon and an upper surface opposing the rear surface of the anchoring member, with an anchor placement member coupled to the anchoring member, having a distal end, and operably configured to have an anchoring position with the distal end displaced a length outwardly away from the rear surface of the anchoring member, and being operably configured to have a first position along an anchoring member translation path with the rear plane non-co-planar with the bottom plane and a second position along the anchoring member translation path with the rear plane co-planar with the bottom plane.

7 Claims, 8 Drawing Sheets

Related U.S. Application Data 27, 2016, now abandoned, which is a continuation-in-part of application No. 14/933,868, filed on Nov. 5, 2015, now Pat. No. 9,410,785, which is a continuation-in-part of application No. 14/696,602, filed on Apr. 27, 2015, now Pat. No. 9,194,683.

(51) Int. Cl.
   *G01B 3/1056* (2020.01)
   *G01B 3/1046* (2020.01)

(58) Field of Classification Search
   USPC ............ 33/770, 27.01, 27.02, 27.03, 27.031, 33/27.032, 668
   See application file for complete search history.

(56) References Cited

U.S. PATENT DOCUMENTS

| | | | |
|---|---|---|---|
| 2,542,537 A * | 2/1951 | Klemm | B43L 7/005 33/27.03 |
| 2,818,644 A | 1/1958 | Crawford | |
| 2,906,024 A * | 9/1959 | Smith | G01B 3/1084 33/27.03 |
| 2,952,025 A | 9/1960 | Johnson | |
| 2,983,048 A * | 5/1961 | Keller | B43L 9/007 33/27.03 |
| 3,120,059 A * | 2/1964 | Quenot | G01B 3/1084 33/27.03 |
| 3,242,578 A * | 3/1966 | Moll | G01C 15/00 33/340 |
| 4,255,856 A | 3/1981 | Mackie | |
| 4,267,638 A * | 5/1981 | Heinz | B43L 9/007 33/27.03 |
| 4,949,462 A | 8/1990 | Spencer | |
| 5,050,309 A * | 9/1991 | Wang | B43L 9/007 33/449 |
| 5,134,784 A * | 8/1992 | Atienza | G01B 3/1084 33/668 |
| 5,349,760 A | 9/1994 | Devito | |
| 5,379,524 A * | 1/1995 | Dawson | G01C 9/36 33/768 |
| 5,542,184 A | 8/1996 | Beard | |
| 5,966,820 A | 10/1999 | Cornacchio | |
| 6,070,339 A | 6/2000 | Garity | |
| 6,298,562 B1 | 10/2001 | Duquette | |
| 6,405,443 B1 * | 6/2002 | Thorn | B43L 9/04 33/27.03 |
| 6,467,174 B1 | 10/2002 | Kotori | |
| 6,694,622 B2 | 2/2004 | Kim | |
| 6,912,799 B1 | 7/2005 | Smith | |
| 6,931,734 B2 * | 8/2005 | Elder | G01B 3/1071 33/42 |
| 7,240,439 B2 * | 7/2007 | Critelli | G01B 3/1056 33/758 |
| 7,260,898 B2 | 8/2007 | Snelson | |
| 7,287,329 B2 | 10/2007 | Cornacchio | |
| 7,340,836 B2 | 3/2008 | Whitemiller et al. | |
| 8,020,312 B1 | 9/2011 | McGahan | |
| 8,225,520 B2 * | 7/2012 | Rabin | G01C 9/34 33/668 |
| 8,819,954 B1 | 9/2014 | Fernandez | |
| 8,832,958 B2 * | 9/2014 | Mabey | G01B 3/1005 33/770 |
| 9,194,683 B1 * | 11/2015 | Deutscher | G01B 3/1084 |
| 9,322,628 B2 * | 4/2016 | Burch | G01B 3/1056 |
| 9,410,785 B1 * | 8/2016 | Deutscher | G01B 3/1084 |
| 2003/0019116 A1 * | 1/2003 | DeWall | G01B 3/1041 33/42 |
| 2003/0154617 A1 * | 8/2003 | Ricalde | B25H 7/04 33/770 |
| 2009/0249636 A1 | 10/2009 | Reda et al. | |

\* cited by examiner

TAPE MEASURE DEVICE AND ATTACHMENT FOR MEASURING AND CUTTING DRYWALL

FIELD OF THE INVENTION

The present invention relates generally to measuring and cutting drywall, and, more particularly, relates to a tape measure attachment device and method for simultaneously holding a tape measure and a tool while measuring and/or cutting drywall.

BACKGROUND OF THE INVENTION

It is well known that sheet materials, such as drywall, i.e., plasterboard, Gyproc®, etc., is commonly used in the construction of houses, buildings, and the like. Measuring and cutting, i.e., scoring, the drywall can be a tedious and time-consuming task. The scoring process begins with a user measuring the length and width of the area where the drywall is to be placed using a measuring device, such as a ruler or tape measure. Thereafter, the user provides reference marks on the drywall corresponding to the dimensions of the measured area. In some instances, a straight edge is placed on the drywall and lined up in accordance with the reference marks.

A sheet rock knife, utility knife, etc., is used to cut along the straight edge through a first layer of the drywall, preferably without cutting completely through the drywall. In some instances, the user simultaneously holds a first end of the tape measure flush against a pencil and/or utility knife in one hand, and a second end of the tape measure having the reel portion in the alternate hand, such that the tape measure extends across the drywall. The user then slides both hands down the drywall so that the pencil and/or utility knife will score a line that is parallel to the edge of the drywall. This often leads to inaccurate results and is unsafe for the user wielding the utility knife. The drywall is turned over and a portion of the drywall is bent at an approximate ninety-degree angle. Such configuration allows the user to cut through the backside of the drywall, along the bend, to remove the fractured portion of the drywall that is to be discarded by the user.

Devices that improve upon the basic scoring of drywall are well-known. For example, at least one known device utilizes a utility knife permanently coupled to a tape measure. Such configuration does not allow the user to employ the tape measure independent of the utility knife. Another known device utilizes a utility knife that must be secured to the tape measure through nuts, bolts, or other fastening mechanisms. Following use, the utility knife must be unfastened from the tape measure. Such configuration is time consuming and may result in the risk of a user losing the various components required for assembly. These known devices also fail to adequately keep a tape measure in place while cutting and/or measuring. These known devices also fail to permit a tape measure from effectively and efficiently creating arcs and other arcuate shapes.

An additional known device utilizes a cutter attached to an end of a tape measure. Such configuration leaves the blade of the cutter exposed, which is hazardous for the user. As an added problem, the method of locking the blade requires tedious maneuvering when the user desires to remove or change the blade. Yet another known device utilizes a T-shape ruler that is bulky and inconvenient to carry and manipulate during the scoring of the drywall. These devices also suffer from the same deficiencies described above.

Further, additional known devices for cutting, marking, and/or scoring drywall also do not provide users the ability effectively and efficiently generate arcs or circles in said drywall or other mediums. Those devices that do give users the ability to generate arcs or circles include housings or tapes of the tape measure that are specially designed, leading to an overall increase in production/manufacturing/resale costs, and/or require the use of permanently installed inscribing and/or support mechanisms. In addition to an overall increase in production/manufacturing/resale costs, some of these permanently installed inscribing and/or support mechanisms also prevent the user from using the tape to generate the desired dimensions of the circle or arc. Said another way, the user is limited to only one particular dimension for the arc and/or the desired dimension for the arc in accurate. These devices also suffer from the same deficiencies described above.

Therefore, a need exists to overcome the problems with the prior art as discussed above.

SUMMARY OF THE INVENTION

The invention provides a tape measure device and attachment for measuring and cutting drywall that overcomes the hereinafore-mentioned disadvantages of the heretofore-known devices and methods of this general type and that effectively and efficiently permits a tape measure to stay in place while cutting and/or measuring. Additional embodiments of the present invention allow the tape measure to create arcs, lines, and other shapes.

With the foregoing and other objects in view, there is provided, in accordance with the invention, a tape measure device and attachment for measuring and cutting drywall that includes a tape measure with an anchoring member disposed at the rear end of the housing and having a rear surface defining a rear aperture and a rear plane thereon and an upper surface opposing the rear surface of the anchoring member, with an anchor placement member coupled to the anchoring member, having a distal end, and operably configured to have an anchoring position with the distal end displaced a length outwardly away from the rear surface of the anchoring member, and being operably configured to have a first position along an anchoring member translation path with the rear plane non-co-planar with the bottom plane and a second position along the anchoring member translation path with the rear plane co-planar with the bottom plane.

Although the invention is illustrated and described herein as embodied in a tape measure device and attachment for measuring and cutting drywall, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of a tape measure from an end that makes contact with a tape measure reel toward a tang of the tape measure.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient tape measure device and attachment assembly that enables effective, efficient, and safe anchoring to and measuring of drywall and other structures.

Referring now to FIGS. 1-15, one embodiment of the present invention is shown in various views and configurations. The figures show several advantageous features of the present invention, but, as will be described below, the invention can be provided in several shapes, sizes, combinations of features and components, and varying numbers and functions of the components. The first example of a tape measure device and attachment 100 for measuring and cutting drywall, as shown in the figures, includes a tape measure 100 having a housing 102 with a front end 1000, a rear end 104 opposing the front end 1000 of the housing, a bottom surface 700 defining a bottom plane 308, an upper surface 106 opposing the bottom surface 700 of the housing 102, and a tape member 500 having a plurality of indicia 1100 corresponding to incremental distances disposed along a measuring tape length 1102. The tape member 500 is operably configured to be selectively extendable and/or retracted from the housing 102. As best seen in FIGS. 11-15, the tape measure 100 can also be seen having unique tang 1104 coupled to a free end 1106 of the tape member 502, wherein the tang 1104 may include an extension member, tab, and tool placement zone operably configured to place and/or retain a tool for marking and/or cutting drywall. To that end, the disclosures in U.S. patent application Ser. No. 14/696,602, U.S. Pat. Nos. 9,194,683, and 9,410,785 are claimed priority to and incorporated herein by reference.

With reference to FIGS. 1-10, the tape measure 100 can be seen having an anchoring member 108 disposed at the rear end 104 of the housing 102 and having a rear surface 300 defining a rear aperture 400 and a rear plane 306 thereon. The anchoring member 108 may include an upper surface 302 opposing the rear surface 300 of the anchoring member 108 as depicted in the figures. The anchoring member 108 beneficially includes an anchor placement member 110 coupled to the anchoring member 108. The anchor placement member 110 has a distal end 304, and is operably configured to have an anchoring position with the distal end 304 displaced a length outwardly away from the rear surface 300 of the anchoring member 108. In one embodiment, the length displaced is approximately 0.1-0.25 inches, while said length may lie outside of said range in other embodiments. The displaced length of the distal end 304 enables the housing 102 of the tape measure 100 lock or be held in place with the user applying a minimal compressive force (e.g., 0.25-31 bf) on the upper surface 302 and/or the anchor placement member 110.

The anchoring member 108 is operably configured to have a first position (FIGS. 5-10) along an anchoring member translation path 112 with the rear plane 306 non-co-planar with the bottom plane 308 and a second position (FIGS. 1-4) along the anchoring member translation path 112 with the rear plane 306 co-planar with the bottom plane 308. Said another way, the anchoring member 108 is operably configured to be positioned in a substantially flat position or otherwise aligned with the bottom surface of the housing 102 the tape measure 100, thereby enabling efficient and effective measuring or cutting of drywall. In one embodiment, a hinge 200 is employed to rotatably couple the anchoring member 108 to the housing 102 of the tape measure 100. In one embodiment, the anchoring member translation path 112 of a circular shape, with a distal free end of the anchoring member 108 operably configured to be removed from the housing, e.g., with a snap tab, magnet(s), fastener(s), etc. In another embodiment, the anchoring member translation path 112 may be linear (by sliding out the anchoring member 108 from the housing 102).

Figure 3:
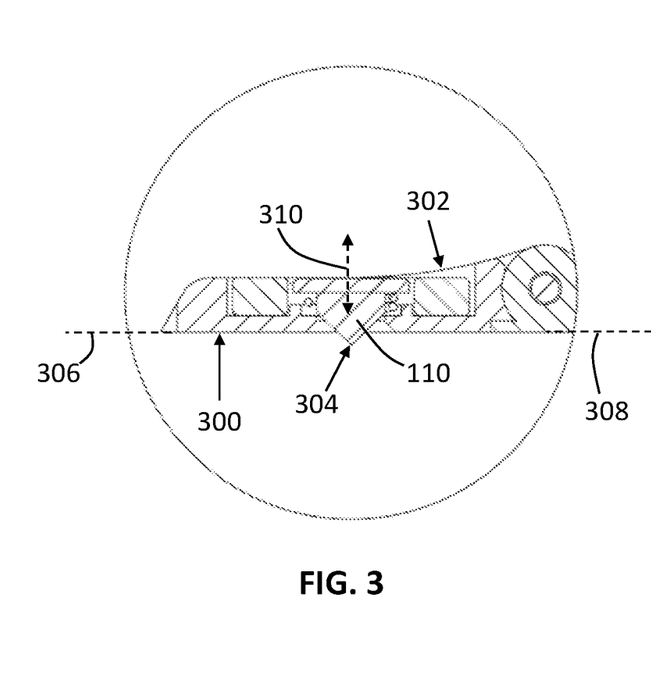
FIG. 3 is a cross-sectional close-up view of a rear anchoring member, in an anchored position, of the tape measure device and attachment assembly in FIG. 1 in accordance with one embodiment of the present invention.
Figure 4:
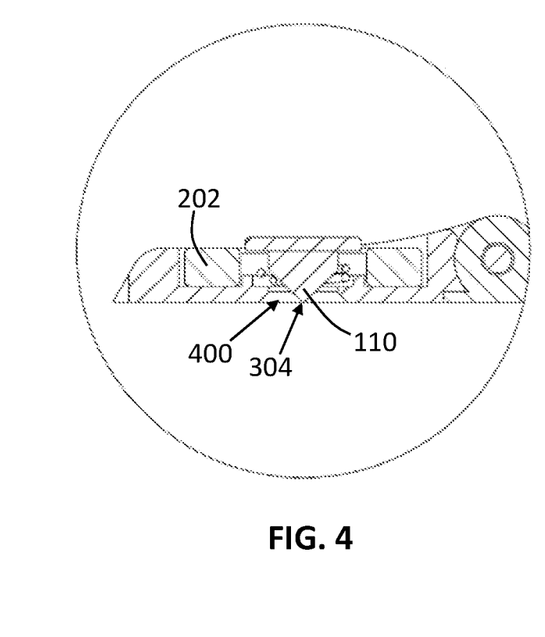
FIG. 4 is a cross-sectional close-up view of a rear anchoring member, in non-anchored position, of the tape measure device and attachment assembly in FIG. 1 in accordance with one embodiment of the present invention.
Figure 5:
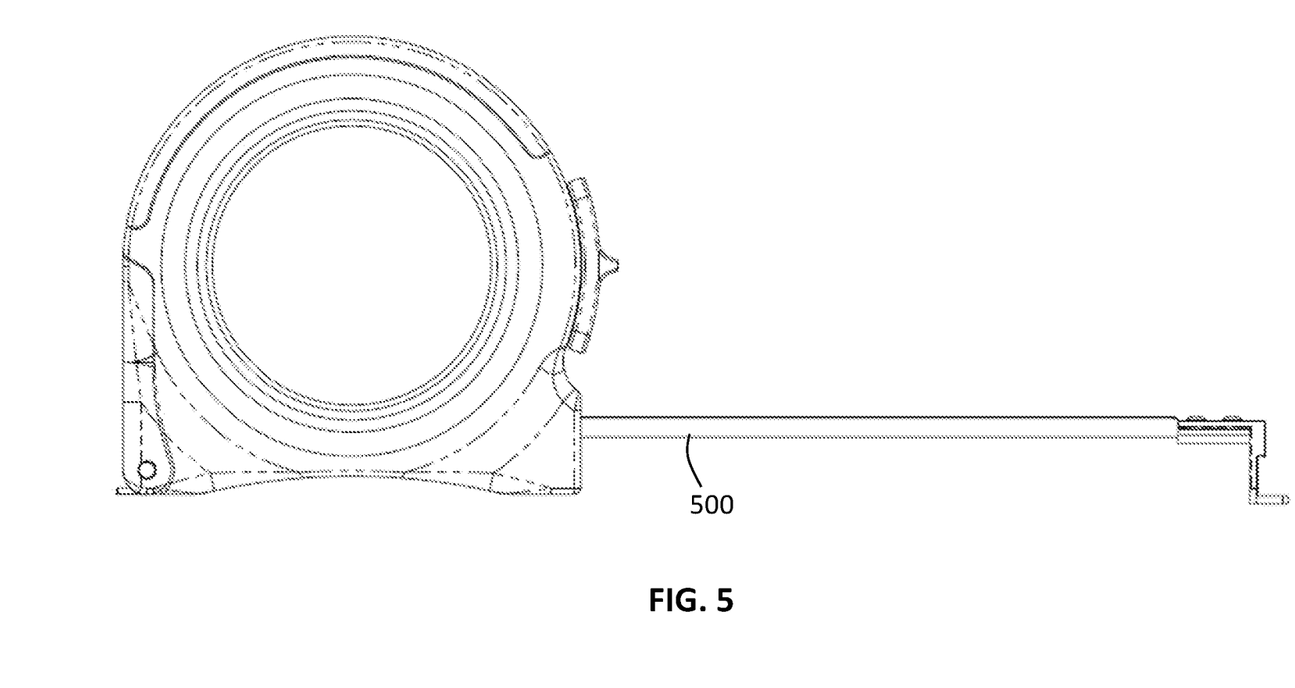
FIG. 5 is an elevational left-side view of the tape measure device and attachment assembly in FIG. 1 with the tape in an extended position.
Figure 6:
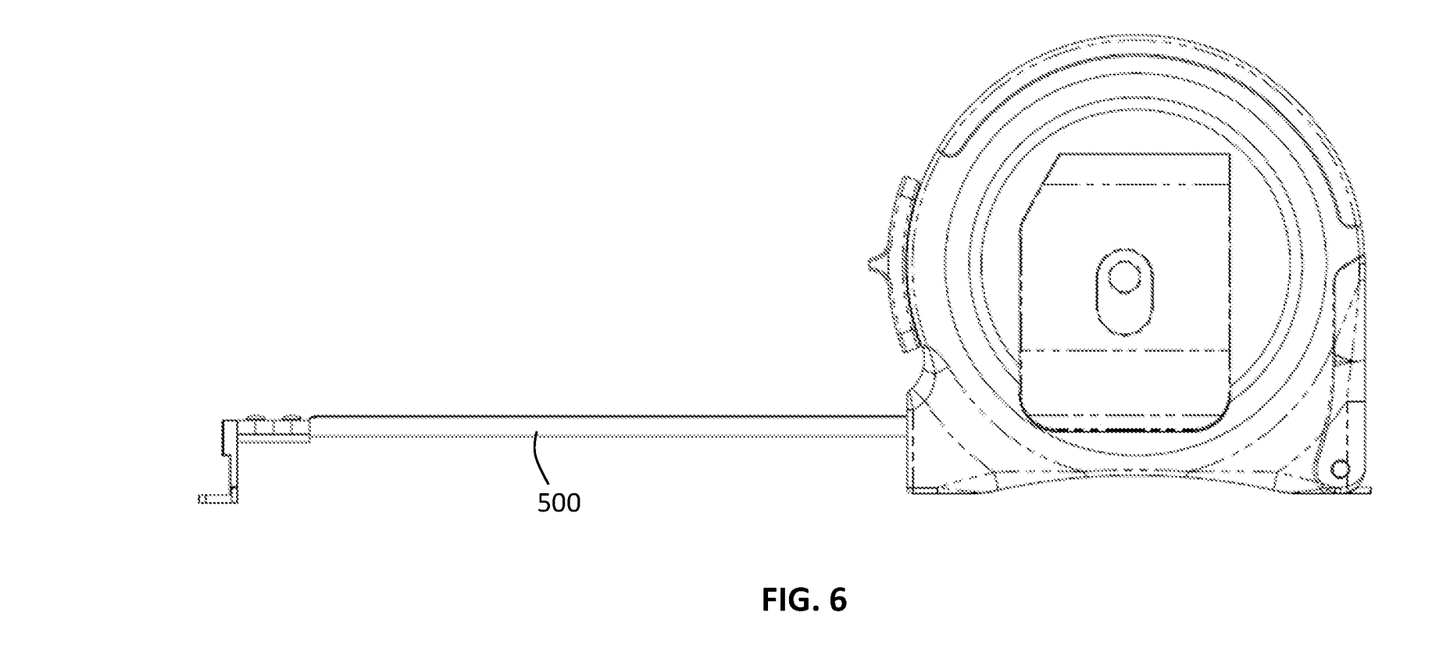
FIG. 6 is an elevational right-side view of the tape measure device and attachment assembly in FIG. 5.
Figures 7, 8:
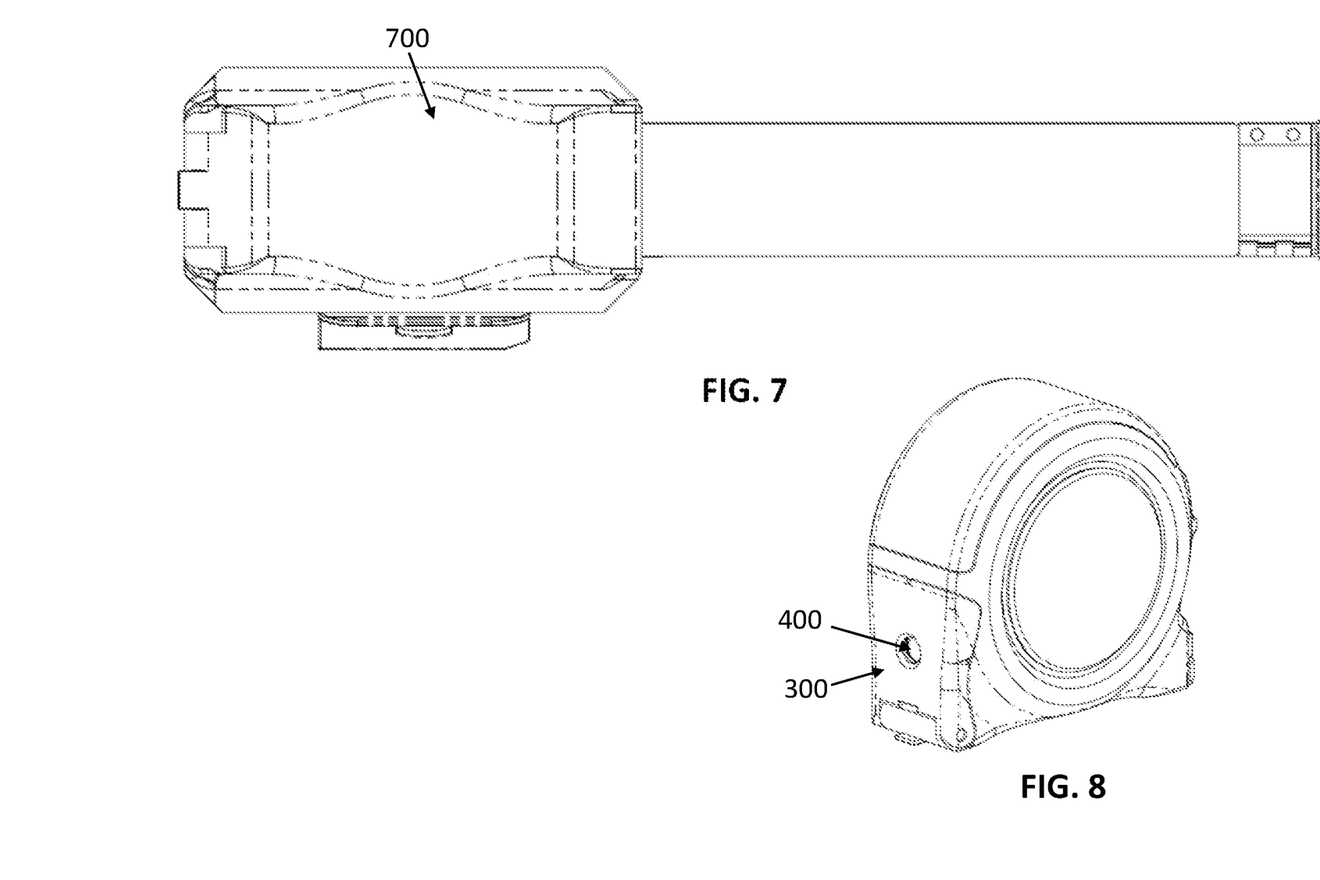
FIG. 7 is a bottom plan view of the tape measure device and attachment assembly in FIG. 5.
FIG. 8 is a perspective rear view of the tape measure device and attachment assembly in FIG. 1 with the anchoring member in a retracted position in accordance with one embodiment of the present invention.
Figure 9:
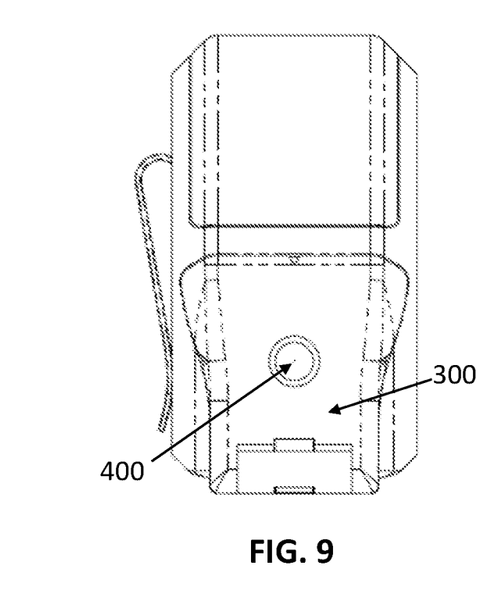
FIG. 9 is an elevational rear view of the tape measure device and attachment assembly in FIG. 8.
Figure 10:
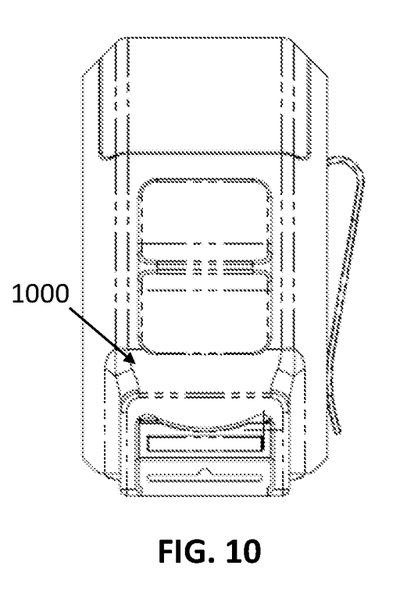
FIG. 10 is an elevational front view of the tape measure device and attachment assembly in FIG. 8.
Figures 11, 12:
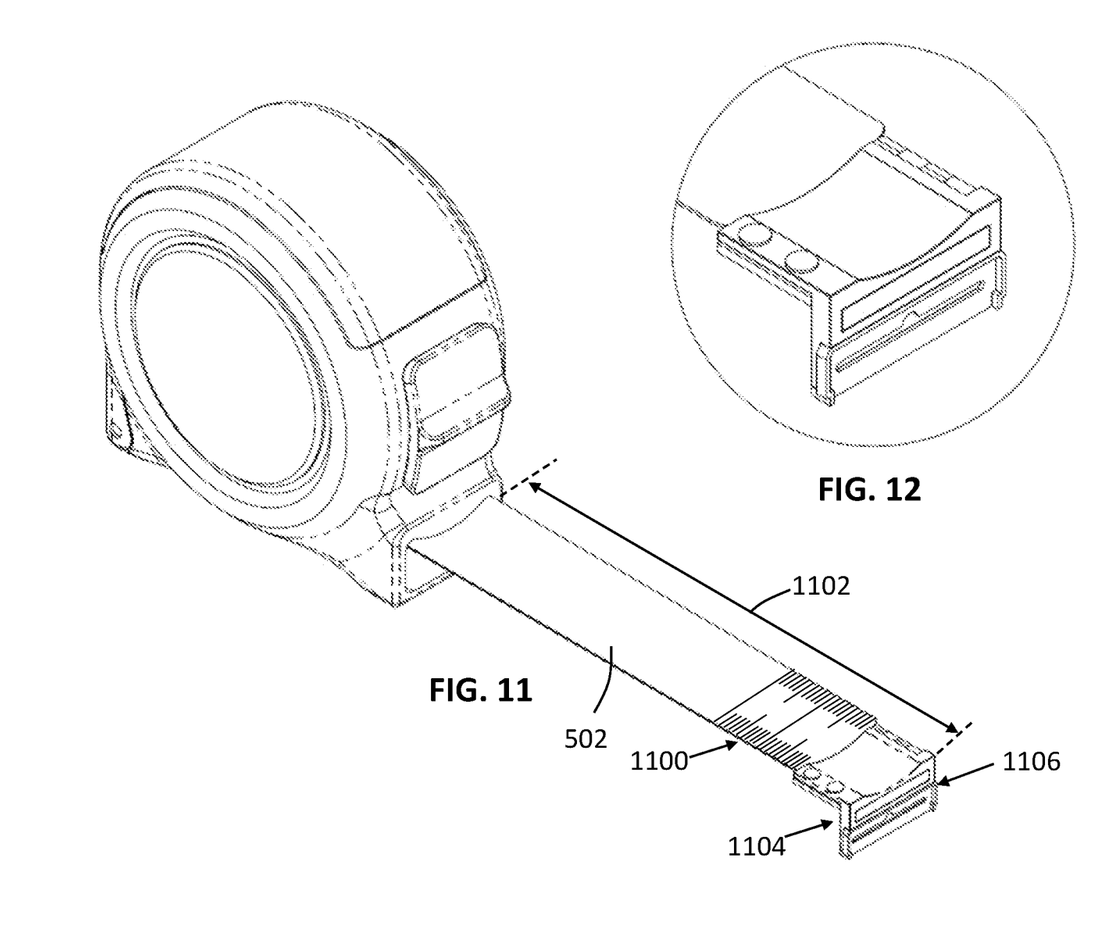
FIG. 11 is a perspective front view of the tape measure device and attachment assembly with the anchoring member in a retracted position and the tape in an extended position in accordance with one embodiment of the present invention.
FIG. 12 is a close-up view of a tang of the tape measure device and attachment assembly in FIG. 11.
Figures 13, 14, 15:
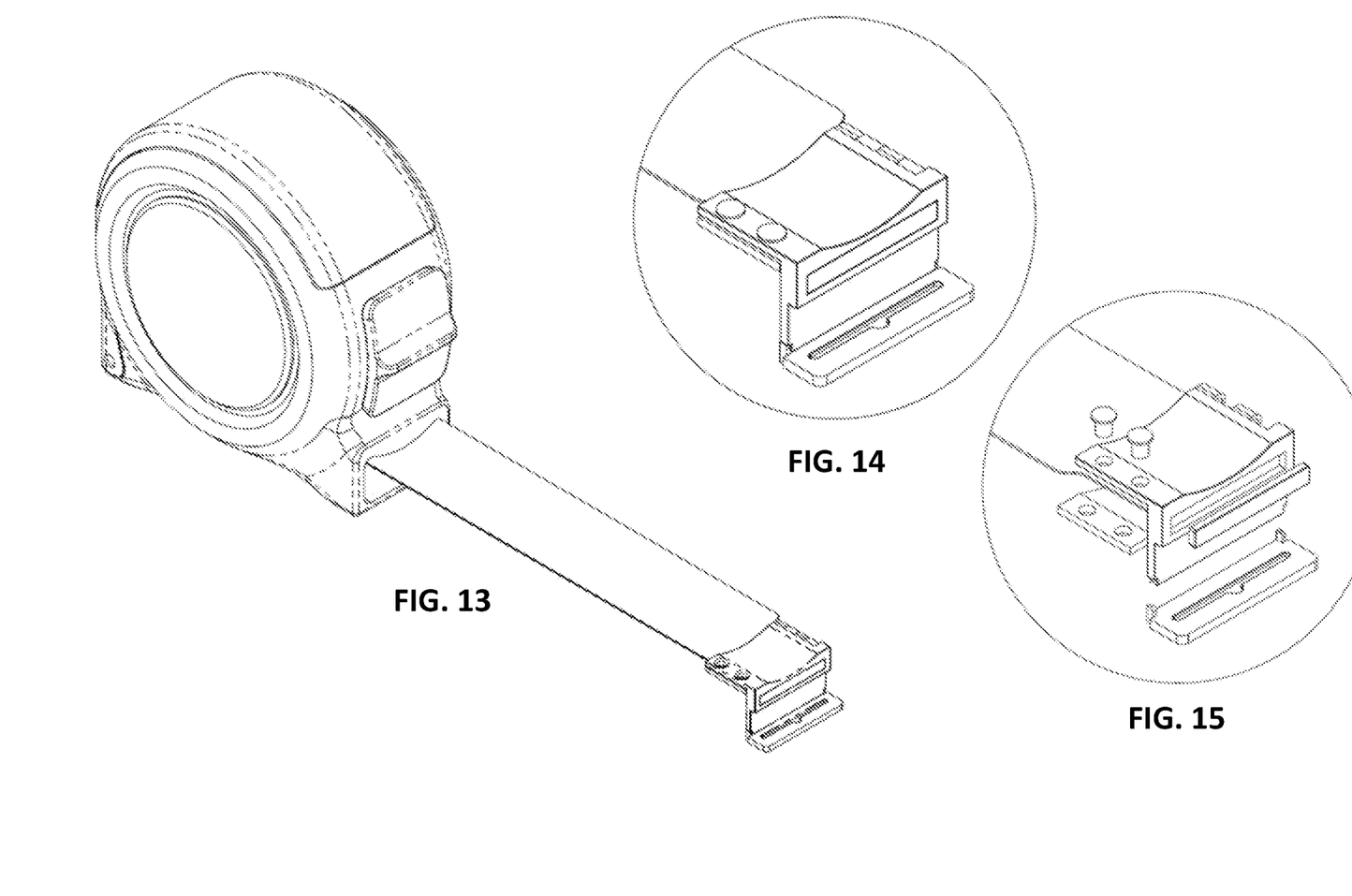
FIG. 13 is a perspective front view of the tape measure device and attachment assembly with the anchoring member in a retracted position and the tape in an extended position in accordance with one embodiment of the present invention.
FIG. 14 is a close-up view of a tang and tab of the tape measure device and attachment assembly in FIG. 13 in accordance with one embodiment of the present invention.
FIG. 15 is a cross-sectional close-up view of a tang and tab in FIG. 14 in accordance with one embodiment of the present invention.

In one embodiment, the anchor placement member 110 is translatably coupled to the anchoring member 108 and operably configured to have a non-anchoring position along an anchor translation path 310 with the distal end 304 recessed within the anchoring member 108. Said another way, the distal end 304 may be fully recessed within or level with the anchoring member 108. In one embodiment, the anchor translation path 310 is linear, while it may be curvilinear in other embodiments.

Figure 1:
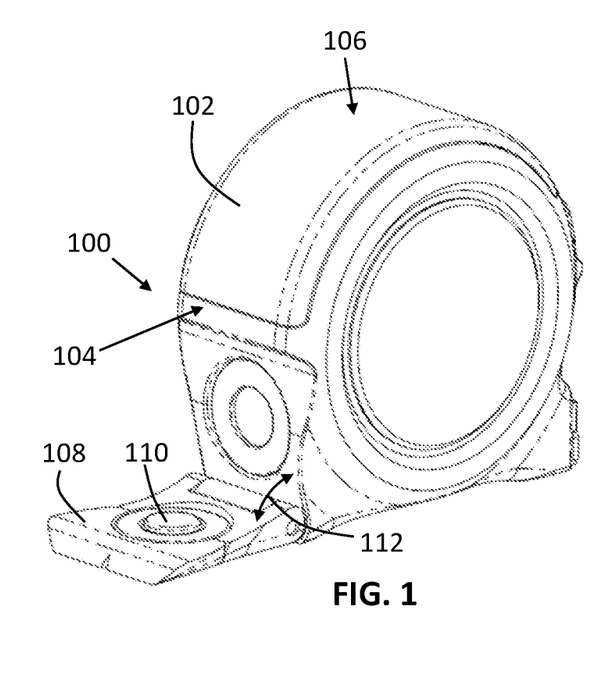
FIG. 1 is a rear perspective view of a tape measure device and attachment assembly in accordance with one embodiment of the present invention.
Figure 2:
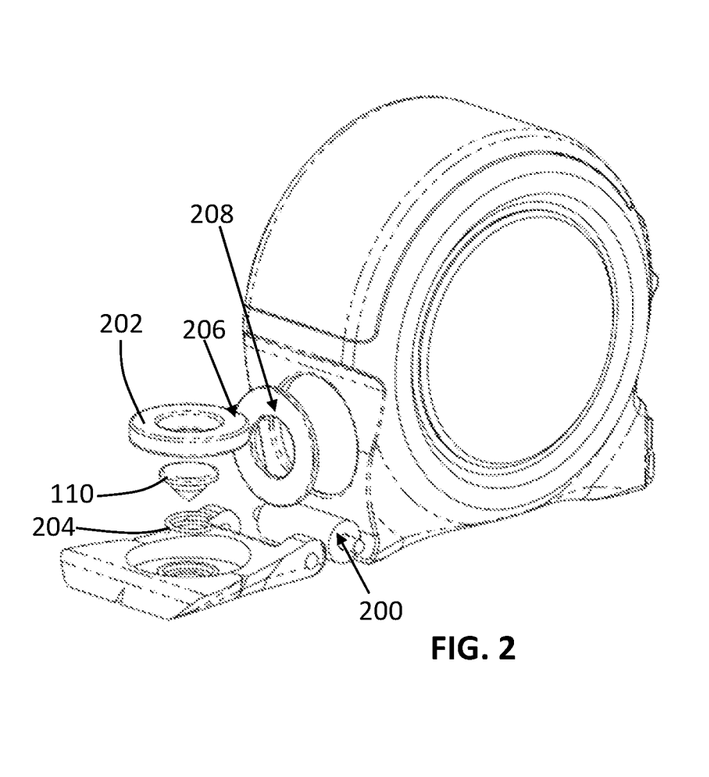
FIG. 2 is a partially exploded rear perspective view of the tape measure device and attachment assembly in FIG. 1 in accordance with one embodiment of the present invention.

The anchoring member 108 may also include a retention cap 202 directly coupled to the anchor placement member 110 and operably configured to restrict the linear movement of the anchoring member 108, e.g., using a flange. In other embodiments, the retention cap 202 may simply surround (partially or fully) the anchor placement member 110 and may serve to facilitate attachment of the anchoring member 108 to the housing 102. To effectuate placement of the anchor placement member 110, a spring member 204 may be employed, wherein the spring member 204 may be coupled to the anchor placement member 110 and biases the anchor placement member 110 in the non-anchoring position.

In one embodiment, the retention cap 202 includes an upper surface 206 of a magnetic material. Similarly, the housing 102 of the tape measure 100 may include a surface portion 208 thereon of a magnetic material with an opposite polarity to the magnetic material of the upper surface 206 of the retention cap 202. As such, the retention cap 202 will be operable to magnetically couple with the surface portion 208. Preferably, the retention cap 202 will magnetically couple with the surface portion 208 around a perimeter, thereby enabling secure coupling to the housing 102. In one embodiment, the surface portion 208 is formed by a O-ring substantially of a magnetic material, wherein the O-ring is recessed within the housing 102. To that end, in one embodiment, the anchoring member 108 is operably configured to have a retracted position (shown best in FIGS. 5-10) completely recessed or flush with the housing 102, thereby giving the housing 102 an appearance of a normal or conventional tape measure. To place the anchoring member 108 in an extended position (shown best in FIGS. 1-4), the anchoring member 108 may include a tab or recess formed thereon. In one embodiment, the extended position may be lockable using, for example, a friction-inducing hinge member or a tongue-and-groove configuration.

In one embodiment, the anchor placement member 110, which may be of a substantially rigid material, e.g., PVC, stainless steel, etc., tapers in diameter to the distal end 304 of the anchor placement member 110. The distal end 304 of the anchor placement member 110 may be of a point, or may be another shape. The distal end 304 may also include a friction inducing material thereon, e.g., natural rubber, to restrict movement of the tape measure 100. The rear aperture 400 is enclosed and may also be of a diameter less than a diameter of the anchor placement member 110.

What is claimed is:

1. In combination with a tape measure having a housing with a front end, a rear end opposing the front end of the housing and with a rear surface, a bottom surface defining a bottom plane, an upper surface opposing the bottom surface of the housing, and a tape member having a plurality of indicia corresponding to incremental distances disposed along a measuring tape length, the tape member operably configured to be selectively extendable from the housing, the improvement comprising:

an O-ring recessed within the housing, of a magnetic material, and defining a portion of the rear surface on the rear end of the tape measure; and an anchoring member:
  disposed at the rear end of the housing and having a rear surface defining a rear aperture and a rear plane thereon and an upper surface opposing the rear surface of the anchoring member;
  with an anchor placement member coupled to the anchoring member, having a distal end, and operably configured to have an anchoring position along an anchor translation path and with the distal end displaced a length outwardly away from the rear surface of the anchoring member; and
  operably configured to have a first position along an anchoring member translation path with the rear plane non-co-planar with the bottom plane and a second position along the anchoring member translation path with the rear plane co-planar with the bottom plane;

a retention cap directly coupled to the anchor placement member, having an upper surface of a magnetic material surrounding a perimeter thereon and with an opposite polarity to the magnetic material of the O-ring, restricting linear movement thereof, and operably configured to magnetic couple with the O-ring around the perimeter of the retention cap when in the first position along the anchoring member translation path; and a spring member directly coupled to the anchor placement member and biasing the anchor placement member in a non-anchoring position along the anchor translation path.

2. The improvement according to claim 1, further comprising:

a hinge rotatably coupling the anchoring member to the housing of the tape measure, the anchoring member translation path of a circular shape.

3. The improvement according to claim 1, wherein:

the anchor placement member is translatably coupled to the anchoring member and operably configured to have a non-anchoring position along the anchor translation path with the distal end recessed within the anchoring member.

4. The improvement according to claim 1, wherein:

the anchor placement member tapers in diameter to the distal end of the anchor placement member.

5. The improvement according to claim 4, wherein:

the rear aperture is enclosed and of a diameter less than a diameter of the anchor placement member.

6. The improvement according to claim 1, wherein the tape member further comprises:

a tang coupled to a free end of the tape member and having:
  an extension member disposed at a substantially perpendicular orientation to a longitudinal direction of the tape member and having an outer face;
  a tab coupled to the terminal end of the extension member, the tab having:
    an upper face defining at least one aperture;
    a first position along a tab translation path with the tab disposed at a substantially perpendicular orientation to the extension member and extending in a direction outwardly away from the outer face of the extension member; and
    a second position along a tab translation path with the tab disposed at an orientation with the tab not extending in a direction outwardly away from the outer face of the extension member; and
  a tool placement zone defined by an outer face of the extension member and the upper face of the tab, the tool placement zone free of any obstructions to allow a tool to be removably placed in the tool placement zone and inserted into the at least one aperture.

7. In combination with a tape measure having a housing with a front end, a rear end opposing the front end of the housing, a bottom surface defining a bottom plane, an upper surface opposing the bottom surface of the housing, and a tape member having a plurality of indicia corresponding to incremental distances disposed along a measuring tape length and having a tang coupled to a free end of the tape member, the tape member operably configured to be selectively extendable from the housing, the improvement comprising:

an anchoring member:
  disposed at the rear end of the housing and having a rear surface defining a rear aperture and a rear plane thereon and an upper surface opposing the rear surface of the anchoring member;
  with an anchor placement member coupled to the anchoring member, having a distal end, and operably configured to have an anchoring position with the distal end displaced a length outwardly away from the rear surface of the anchoring member; and
  operably configured to have a first position along an anchoring member translation path with the rear plane non-co-planar with the bottom plane and a second position along the anchoring member translation path with the rear plane co-planar with the bottom plane, the tang having:
  an extension member disposed at a substantially perpendicular orientation to a longitudinal direction of the tape member and having an outer face;
  a tab coupled to the terminal end of the extension member, the tab having:
    an upper face defining at least one aperture;
    a first position along a tab translation path with the tab disposed at a substantially perpendicular orientation to the extension member and extending in a direction outwardly away from the outer face of the extension member; and
    a second position along a tab translation path with the tab disposed at an orientation with the tab not extending in a direction outwardly away from the outer face of the extension member; and
  a tool placement zone defined by an outer face of the extension member and the upper face of the tab, the tool placement zone free of any obstructions to allow a tool to be removably placed in the tool placement zone and inserted into the at least one aperture.

* * * * *